United States Patent [19]
Kan et al.

[11] 3,761,502

[45] Sept. 25, 1973

[54] PREPARATION OF LIQUID CARBODIIMIDE-CONTAINING ORGANIC POLYISOCYANATES

[75] Inventors: Peter T. Kan, Livonia; Moses Cenker, Trenton, both of Mich.

[73] Assignee: BASF Wyandotte Corporation, Wyandotte, Mich.

[22] Filed: Aug. 13, 1971

[21] Appl. No.: 171,725

[52] U.S. Cl..... 260/453 P, 260/2.5 AT, 260/239 A, 260/453 AL, 260/453 AR, 260/606.5 P
[51] Int. Cl. ........................................... C07c 119/04
[58] Field of Search.................... 260/453 P, 566 R, 260/551 CD

[56] References Cited
UNITED STATES PATENTS

| | | | |
|---|---|---|---|
| 3,635,947 | 1/1972 | Nober et al. | 260/566 X |
| 3,502,722 | 3/1970 | Neumann | 260/566 |
| 3,522,303 | 7/1970 | Ulrich | 260/453 X |
| 3,152,162 | 10/1964 | Fischer | 260/453 |

*Primary Examiner*—Lewis Gotts
*Assistant Examiner*—Dolph H. Torrence
*Attorney*—Robert E. Dunn, Bernhard R. Swick, Robert M. Phipps and Joseph D. Michaels

[57] ABSTRACT

An organic polyisocyanate containing a controlled amount of carbodiimide linkages and which is useful in the preparation of rigid urethane foams.

6 Claims, No Drawings

PREPARATION OF LIQUID CARBODIIMIDE-CONTAINING ORGANIC POLYISOCYANATES

BACKGROUND OF THE INVENTION

1. Field of the Invention

The present invention concerns organic polyisocyanates and in particular organic polyisocyanates containing a controlled amount of carbodiimide linkages. The present invention also relates to methods for preparing such polyisocyanates by heating same in the presence of tris(chloromethyl)phosphine oxide.

2. Prior Art

The advantages accruing to the use of carbodiimide-containing compounds in the preparation of flame retardant urethane products has long been recognized. For instance, Canadian Pat. No. 828,190; U.S. Pat. No. 3,152,162; and U.S. Pat. No. 3,502,722 teach the preparation of carbodiimide-isocyanate adducts which can be used in the preparation of such urethane products. However, in order to practice these teachings, it is incumbent to use either highly elevated temperatures or circuitous reactions, e.g. initial trimerization of the isocyanate, and the like. Moreover, there is not disclosed any means or methods for controlling the carbodiimide content of these products. Hence, the present invention seeks to improve upon the prior art by providing liquid carbodiimide-containing organic polyisocyanates by a process whereby the carbodiimide formation reaction can be controlled.

SUMMARY OF THE INVENTION

Liquid carbodiimide-containing organic polyisocyanates are prepared by heating an organic polyisocyanate in the presence of a catalytically sufficient amount of a carbodiimide formation catalyst, i.e., tris(chloromethyl)phosphine oxide.

Due to the inherent reactivity of this catalytic compound, the carbodiimide content of the resulting product can be controlled. The carbodiimide-containing organic polyisocyanates of the present invention are useful in the preparation of rigid urethane foams and the like.

For a more comprehensive discussion of the present invention, reference is made to the following detailed description and examples thereof.

DESCRIPTION OF THE PREFERRED EMBODIMENTS

In accordance with the present invention, carbodiimide-containing organic polyisocyanates useful in the preparation of rigid polyurethane foam products and the like are prepared by heating an organic polyisocyanate in the presence of a catalytically sufficient amount of tris(chloromethyl)phosphine oxide.

The use of tris(chloromethyl)phosphine oxide in the present invention was unexpected since heretofore this compound has not been reported as being effective in this or related applications. The phosphorous containing compounds which have been employed in the preparation of carbodiimide compounds, as taught in U.S. Pat. Nos. 2,840,589 and 2,941,966 are too reactive to enable control of reactions catalyzed therewith and thus applicants are unaware of any phosphine oxide which could be used in a controlled reaction for preparing liquid carbodiimide-containing organic polyisocyanates.

The only compounds which have been suggested for uses allied to that presented herein are hexamethylphosphoramide (J.J. Monagle, *J. Org. Chem.*, 27,3851 (1962) and U.S. Pat. No. 3,056,835), amino compounds, phenols and the like, as described in the above-identified patents, U.S. Pat. Nos. 3,152,162; 3,502,722; Canada Pat. No. 828,190; and British Pat. No. 1,200,432. Again, however, tris(chloromethyl)phosphine oxide provides an improvement over the art since its reactivity is such that it is possible to control carbodiimide formation thereby enabling the preparation of a liquid polyisocyanate compound containing controlled or tailored amounts of carbodiimide linkages.

A. THE CATALYST

Tris(chloromethyl)phosphine oxide is a compound designated structurally as:

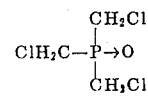

wherein the phosphorus and oxygen atoms are united in a coordinate covalent bond.

This compound is generally prepared by the oxidation, with nitric acid or hydrogen peroxide, of tris(chloromethyl) phosphine. Tris(chloromethyl)phosphine is prepared by the hydrolysis, with sodium bicarbonate or the like, of tetrakis (chloromethyl)phosphonium chloride, which is, in turn, prepared by contacting phosphorus pentachloride with tetrakis(hydroxymethyl)phosphonium chloride. This sequence of reaction can be represented as:

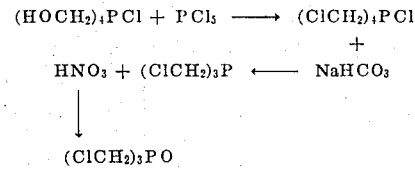

wherein $(HOCH_2)_4PCl$ is tetrakis(hydroxymethyl)phosphonium chloride; $(ClCH_2)_4PCl$ is tetrakis(chloromethyl)phosphonium chloride; and $(ClCH_2)_3P$ is tris(chloromethyl)phosphine; and $(ClCH_2)_3PO$ is tris(chloromethyl)phosphine oxide.

This mode of preparation is known and is more particularly described by A. Hoffman, *J. Am. Chem. Soc.*, v. 52,2995 (1930) and D. M. Jones and T. M. Noone, *J. Appl. Chem.*, v. 12, 399 (1962), the disclosures of which are hereby incorporated by reference.

B. THE ORGANIC POLYISOCYANATE

The organic polyisocyanates which are advantageously employed in the present invention can be represented by the formula:

$$R(NCO)_z$$

wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6- toluene diisocyanate, crude toluene diisocyanate, methylene diphenyl diisocyanate, crude methylene diphenyl diisocyanate and the like; the aromatic triisocyanates such as 4,4',4''-triphenylmethylene triisocyanate, 2,4,6-toluene triisocyanates; the aromatic tetraisocyanates, such as 4,4'-dimethyldiphenylmethane-2,2'—5,5'— tetraisocyanate, and the like; alkyl polyisocyanates, such as xylylene diisocyanate; aliphatic polyisocyanates, such as hexamethylene-1,6-diisocyanate, lysine diisocyanate methylester and the like, and mixtures thereof. Other organic polyisocyanates include polymethylene polyphenylisocyanate, hydrogenated methylene diphenylisocyanate, methylene bis(cyclohexylisocyanate), m-phenylene diisocyanate, naphthylene-1,5-diisocyanate, 1-methoxyphenyl-2, 4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated by the present invention are the so-called "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in *J. Am. Chem. Soc.*, 49, 3181 (1927). These compounds and their methods of preparation are well known in the art. The use of any one specific active hydrogen compound is not critical hereto, rather any such compound that can be used to prepare a quasi-prepolymer can be employed here. Generally speaking the quasi-prepolymers are prepared by reacting an organic polyisocyanate with less than a stoichiometric amount, based on the weight of the polyisocyanate, of the active hydrogen containing compound.

Suitable active hydrogen-containing groups, as determined by the Zerewitinoff method, which are reactive with an isocyanate group include —OH, —NH—, —COOH, and —SH. Examples of suitable types of organic compounds containing at least two active hydrogen containing groups which are reactive with an isocyanate group are hydroxyl-containing polyesters, polyalkylene ether polyols, hydroxy-terminated polyurethane polymers, polyhydric polythioethers, alkylene oxide adducts of acids or phosphorus-containing acids, polyacetals, aliphatic polyols, aliphatic thiols including alkane, alkene and alkyne thiols having two or more —SH groups; diamines including both aromatic, aliphatic, and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one -SH group and one -OH group as well as those which contain an amino group and a -SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethyl- succinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenol) propane, commonly known as Bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amines or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 percent to about 95 percent. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-diamino naphthalene, and 2,4-diamino toluene; aliphatic polyamines such as ethylene diamine, 1,3-propylene diamine, 1,4-butylene diamine, and 1,3-butylene diamine, as well as substituted secondary amino derivatives of the aforementioned polyamines.

Other compounds which do not necessarily fit within any of the previously set forth classes of compounds which are quite suitable in the production of NCO-terminated polyurethane polymers such as a hydroxy-terminated polymer made by reacting an isocyanate with several moles of an alkylene glycol, can be used in preparing the quasi-prepolymers.

In the practice of the present invention, it is preferred that the organic polyisocyanate be either (a) an 80:20 weight mixture of 2,4-and 2,6-toluene diisocyanate, (b) crude toluene diisocyanate, (c) crude methylene diphenyl diisocyanate, or (d) mixtures thereof.

C. PREPARATION OF THE CARBODIIMIDE-CONTAINING ORGANIC POLYISOCYANATES

The liquid carbodiimide-containing organic polyisocyanate compounds of the present invention are generally prepared by heating any one of the aforementioned organic polyisocyanates or mixtures thereof in the presence of a catalytically sufficient amount of tris(-chloromethyl)phosphine oxide. Generally this reaction is carried out at atmospheric pressure and at a temperature ranging from about 75° to 120° C. and preferably from about 80° to 100° C.

The catalyst is generally employed in an amount ranging from 0.1 to 10.0 parts by weight thereof per 100 parts by weight of organic polyisocyanate. Preferably, the catalyst is employed in an amount ranging from about 0.5 to 5 parts by weight thereof per 100 parts by weight of the polyisocyanate.

The time required for carrying out this reaction is critical in ensuring that the final product is liquid, which is in turn dependent on the carbodiimide content of the resulting product, i.e. if the reaction goes too far in production of carbodiimide content, then the product will be solid. Thus, depending on the quantity of catalyst employed, the time for carrying out the reaction will vary from about 0.5 hours to 5 hours. When employing the catalyst in its preferred amount, the time necessary for proceeding with the reaction ranges from about 0.5 hours to 2.0 hours.

After the requisite reaction time period has elapsed, cooling of the resulting product to a temperature below 30° C. will inhibit and stop carbodiimide formation.

As contemplated by the present invention, the starting organic polyisocyanate has from about 9 to 59 percent of its original isocyanate content converted to carbodiimide groups by the practice of the instant invention. Preferably, from about 15 to 35 percent of the isocyanate content of the starting isocyanate is converted to carbodiimide groups. By maintaining the percent of conversion within this range, it is possible to provide liquid carbodiimide-containing organic polyisocyanates.

It should be noted that upon standing for a few days after preparation some of the carbodiimide groups react with some of the isocyanate groups to form a carbodiimide-isocyanate adduct in accordance with the following equation:

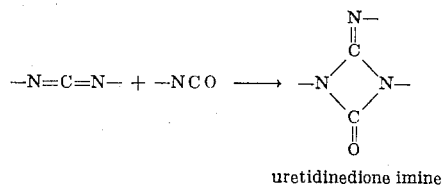

uretidinedione imine

However, upon heating, the reaction will reverse and the adduct will revert back to isocyanate and carbodiimide.

The products of the present invention form mobile to viscous liquids at room temperature. After reaction viscosity can be reduced by addition of unreacted polyisocyanate to the product.

The carbodiimide-containing organic polyisocyanates are useful in the preparation of rigid polyurethane foams. Rigid polyurethane foams in accordance herewith are prepared by the reaction of the carbodiimide-containing organic polyisocyanate and an active-hydrogen containing compound, such as, those previously described. The reaction conditions, as well as various other ingredients, are well-known to the skilled artisan.

For a more complete understanding of the present invention, reference may be made to the following, non-limiting, examples. In the examples all parts, absent indications to the contrary, are by weight.

EXAMPLE I

This example illustrates the preparation of a liquid carbodiimide-containing organic polyisocyanate in accordance with the present invention.

To a suitable reaction vessel equipped with stirring means and heating mantle is added a mixture of 200 parts of 80:20 weight mixture of 2,4- and 2,6-toluene diisocyanate having an isocyanate content of 48.3 percent and 2 parts of tris(chloromethyl) phosphine oxide. With continuous stirring the mixture is heated to 80° C. and maintained thereat for about 2.0 hours. After the 2 hour period has elapsed, the mixture in the vessel is cooled to room temperature by shutting off the heating mantle. The final product is a clear, yellow liquid.

Infrared spectrum of the product shows the presence of carbodiimide and isocyanate groups.

An aliquot sample of the final product in the vessel is next titrated with dibutylamine for isocyanate content in accordance with ASTM D-1638-67T. It is found that the resulting product has an isocyanate content of 43.8 percent and this 4.5 percent decrease in isocyanate content corresponds to a conversion of 9 percent of the isocyanate groups to carbodiimide.

Analyzing the product intermittently over an ensuing eleven day period, it is found, again, by titration, that the isocyanate content is gradually decreasing and by infrared analysis this is found to be due to the formation of the uretidinedione imine groups, i.e.,

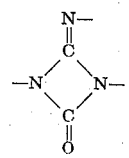

After three days the isocyanate content has dropped to 41.6 percent (14 percent reacted isocyanate); after 6 days the isocyanate content is dropped to 40.2 percent (17 percent reacted isocyanate); and after 11 days the isocyanate has dropped to 37.6 percent (22 percent reacted isocyanate). However, the product remains liquid.

EXAMPLE II

Example I is repeated using 400 parts of the same organic polyisocyanate and 4 parts tris(chloromethyl)phosphine oxide. Titration with dibutylamine again shows that 9 percent of the isocyanate content of the organic polyisocyanate has reacted to form carbodiimide groups in the preparation of the liquid product.

EXAMPLE III

Following the procedure of Example I, a 202 part mixture of 200 parts of the organic polyisocyanate used in Example I and 2 parts of tris(chloromethyl)phosphine oxide is heated for one hour at 100° C. After cooling to room temperature, an aliquot sample of the final product, which is a clear, yellow liquid which shows strong carbodiimide absorption in its infrared spectrum, is analyzed by dibutylamine titration to show that 14 percent of the original isocyanate content has been converted to carbodiimide groups.

This product is then analyzed intermittently over the next seventeen days. The results thereof are set forth below. Again, the decrease in isocyanate content after the preparation of the compound is attributable to the formation of the uretidinedione imine.

| Days | Isocyanate Content, % | % Reacted Isocyanate[2] |
|---|---|---|
| 0[1] | 41.4 | 14 |
| 3 | 39.5 | 18 |
| 6 | 38.0 | 21 |
| 11 | 35.4 | 27 |
| 17 | 32.8 | 32 |

[1] day of preparation of compound, the 14% reacted isocyanate was converted to carbodiimide groups.
[2] the isocyanate reacted after the initial preparation goes into formation of the uretidinedione imine.

EXAMPLE IV

Following the procedure of Example I, a 202 part mixture of organic polyisocyanate and tris(chloromethyl)phosphine oxide similar to that of Example I is heated at 100° C. for about 3.5 hours. The final product, a viscous liquid, when analyzed by titration, reveals that 35 percent of the isocyanate groups of the starting polyisocyanate have been converted to carbodiimide groups. Both the third and fourth day after the preparation of the compound, aliquot samples thereof are analyzed by dibutylamine titration. The results are set forth below:

| Days | Isocyanate Content, % | Isocyanate reacted, % |
|---|---|---|
| 0 | 31.1 | 35 |
| 3 | 29.2 | 40 |
| 4 | 28.8 | 41 |

EXAMPLE V

Following the procedure of Example I, a 202 parts mixture of polyisocyanate and catalyst similar to that of Example I is heated for 3.5 hours at 120° C. Titration of the resulting viscous liquid indicated that 59 percent of the isocyanate content of the starting 80:20 weight mixture of 2,4- and 2,6-toluene diisocyanate has been converted to carbodiimide groups.

EXAMPLE VI

Following the procedures of Example I a mixture consisting of 200 parts of crude toluene diisocyanate having an isocyanate content of about 39 percent and 2 parts of tris(chloromethyl) phosphine oxide is heated for 1 hour at 100° C. and the mixture is then allowed to stand until it cools down to room temperature. The resulting product is a mobile, fluid liquid. When an aliquot sample of this product is subjected to infrared analysis, it is determined that 10 percent of the isocyanate content of the starting polyisocyanate is converted to carbodiimide groups.

Three days after the product is prepared infrared analysis shows that, now, 11 percent of the original isocyanate content has been reacted. After seven days, infrared analysis showed that 13 percent of the original isocyanate content had been reacted. Two weeks after the preparation of the carbodiimide-containing organic polyisocyanate is solidified.

EXAMPLE VII

Using liquid polycarbodiimide-containing polyisocyanate prepared according to Example IV a rigid polyurethane foam is prepared therefrom using the formulation given below. The polyol is a polyether derived polyol having a hydroxy number of 275 and containing 2.5 percent phosphorus and 25 percent bromine. The properties of the foam obtained are shown in the table.

Formulation, pbw.

| Polyol | 100.0 | Amine Catalyst | 1.0 |
|---|---|---|---|
| Silicone surfactant | 1.5 | Halohydrocarbon Blowing AGent | 23.0 |
| Water | 1.0 | | |
| | | Polycarbodiimide polyisocyanate | 94.5 |
| | | NCO/OH ratio | 1.2 |

Foam Properties

| | |
|---|---|
| Density, pcf. | 2.13 |
| Compressive strength, psi at 10% deflection | 23 |
| Closed cell content, % | 98 |
| Tumbling friability, % weight loss | 8.7 |
| Butler Chimney Test, % wt. retention | 53 |

We claim:

1. A process for the preparation of a liquid carbodiimide-containing organic polyisocyanate comprising:
   a. heating an organic polyisocyanate to a temperature ranging from about 75° to 120° C. for a period ranging from about 0.5 to 5 hours in the presence of a catalytically sufficient amount of tris(chloromethyl)phosphine oxide and
   b. stopping the reaction by cooling the product resulting from step (a) to a temperature below 30° C.

2. The process of claim 1 wherein the organic polyisocyanate has from about 9 to 59 percent of its original isocyanate content converted to carbodiimide groups.

3. The process of claim 1 wherein the tris(chloromethyl) phosphine oxide is present in an amount ranging from about 0.1 to 10.0 parts by weight thereof per 100 parts by weight of organic polyisocyanate.

4. The process of claim 3 wherein the tris(chloromethyl) phosphine oxide is present in an amount ranging from about 0.5 to 5.0 parts by weight thereof per 100 parts by weight of organic polyisocyanate.

5. The process of claim 4 wherein the organic polyisocyanate is heated at a temperature ranging from about 80° to 100° C. for a period ranging from about 0.5 to 2 hours.

6. The process of claim 1 wherein the organic polyisocyanate is selected from the group consisting of (a) an 80:20 weight mixture of 2,4- and 2,6- toluene diisocyanate, (b) crude toluene diisocyanate, (c) crude methylene diphenyl diisocyanate, and (d) mixtures thereof.

* * * * *